United States Patent
Xu

(10) Patent No.: US 8,246,016 B2
(45) Date of Patent: Aug. 21, 2012

(54) DOWNCOMER FOR A GAS-LIQUID CONTACTING DEVICE

(75) Inventor: Zhanping Xu, East Amherst, NY (US)

(73) Assignee: UOP LLC, Des Plaines, IL (US)

( * ) Notice: Subject to any disclaimer, the term of this patent is extended or adjusted under 35 U.S.C. 154(b) by 734 days.

(21) Appl. No.: 12/176,305

(22) Filed: Jul. 18, 2008

(65) Prior Publication Data

US 2010/0013111 A1    Jan. 21, 2010

(51) Int. Cl.
 *B01F 3/04* (2006.01)
(52) U.S. Cl. ............ 261/114.5; 261/108; 261/113; 261/114.1; 264/125
(58) Field of Classification Search .......... 261/108, 261/113, 114.1, 114.5
See application file for complete search history.

(56) References Cited

U.S. PATENT DOCUMENTS

| | | | |
|---|---|---|---|
| 1,982,226 A * | 11/1934 | Monro | 261/114.2 |
| 2,646,977 A | 7/1953 | Kraft | |
| 4,159,291 A * | 6/1979 | Bruckert et al. | 261/114.1 |
| 4,499,035 A | 2/1985 | Kirkpatrick et al. | |
| 4,550,000 A * | 10/1985 | Bentham | 261/114.1 |
| 5,051,214 A | 9/1991 | Chen | |
| 5,223,183 A | 6/1993 | Monkelbaan et al. | |
| 5,366,666 A * | 11/1994 | Chuang et al. | 261/97 |
| 5,382,390 A | 1/1995 | Resetarits et al. | |
| 5,531,884 A | 7/1996 | Johnson et al. | |
| 5,702,647 A * | 12/1997 | Lee et al. | 261/114.5 |
| 6,053,484 A * | 4/2000 | Fan et al. | 261/114.1 |
| 6,116,583 A | 9/2000 | Agnello | |
| 6,131,891 A | 10/2000 | Resetarits et al. | |
| 6,293,526 B1 * | 9/2001 | Fischer et al. | 261/97 |
| 6,722,639 B2 * | 4/2004 | Ender et al. | 261/97 |
| 6,736,378 B2 | 5/2004 | Colic et al. | |
| 6,739,585 B1 | 5/2004 | Urbanski et al. | |
| 6,783,120 B2 | 8/2004 | Shakur et al. | |
| 6,902,154 B2 * | 6/2005 | Bosmans et al. | 261/114.1 |
| 7,232,115 B2 | 6/2007 | Sastry | |
| 2005/0046051 A1 | 3/2005 | Sastry | |
| 2007/0126134 A1 | 6/2007 | Xu et al. | |
| 2007/0137482 A1 | 6/2007 | Xu et al. | |

FOREIGN PATENT DOCUMENTS

KR    100698006 B1    3/2007

* cited by examiner

*Primary Examiner* — Robert J Hill, Jr.
*Assistant Examiner* — Christopher P Jones
(74) *Attorney, Agent, or Firm* — Mark R Willis

(57) ABSTRACT

A downcomer for a gas-liquid contacting device. The downcomer may include first and second spaced apart side walls, first and second end walls, a floor, and first and second opposing discharge walls. Generally, each end wall is coupled to a respective end of the first and second side walls. Typically, the floor is coupled to the side walls and end walls, and the floor has at least one section adapted for permitting the passage of liquid there-through. The first and second opposing discharge walls can be coupled to respective first and second side walls and having respective ends below the floor.

6 Claims, 5 Drawing Sheets

DOWNCOMER FOR A GAS-LIQUID CONTACTING DEVICE

FIELD OF THE INVENTION

This invention generally relates to gas-liquid contacting.

DESCRIPTION OF THE RELATED ART

Often, a gas-liquid contacting apparatus can be used to separate chemical compounds. Typically, such an apparatus includes a fractional distillation column that, in turn, includes one or more fractional distillation trays. Such columns can be employed in a variety of industries, such as food, pharmaceutical, chemical, refinery, or petrochemical processing.

Generally, vapor rises and liquid descends in the column. The trays can have perforations, typically circular, evenly distributed across the contacting surface of the tray. These perforations can allow rising vapor to flow upwards and interact with liquid flowing across the tray.

Often, downcomers can be used with distillation trays for transferring liquid from one tray to the next through openings located at the bottom of the downcomers. The openings can be dynamically sealed by liquid in the downcomer to prevent vapor from passing upwards. Generally, the area of the openings is primarily determined by the liquid rate at turndown operating conditions to ensure the openings are sealed at a minimum operating liquid load.

Unfortunately, downcomers can have limited operating ranges. As an example, when the downcomer openings are sealed at a minimum operating liquid load, the depth of the downcomers can be insufficient at increased operating capacities due to limited downcomer openings and increased tray pressure drops. Thus, liquid can overflow the downcomer and back-up onto the tray. As a result, the increased operating capacity can require deeper downcomers, which in turn, can require higher tray spacings that can reduce the number of trays installed in an existing column or can increase the column height for a new design. As such, the lack of adequate downcomer operating range can result in poor product quality, increased energy consumption, and/or increased capital spending. What is more, if it is determined that increased loading is desired for an existing column, the removal and installation of new downcomers for increasing capacity can be very costly. Consequently, there is a desirability to provide and/or modify a downcomer that can operate at a wide range of operating conditions.

SUMMARY OF THE INVENTION

One exemplary embodiment can be a downcomer for a gas-liquid contacting device. The downcomer may include first and second spaced apart side walls, first and second end walls, a floor, and first and second opposing discharge walls. Generally, each end wall is coupled to a respective end of the first and second side walls. Typically, the floor is coupled to the side walls and end walls, and the floor has at least one section adapted for permitting the passage of liquid therethrough. The first and second opposing discharge walls can be coupled to respective first and second side walls and having respective ends below the floor.

A further exemplary embodiment can be a pan for a gas-liquid contacting device. The pan may include first and second end walls generally impervious to liquid passage, and a bottom portion forming a plurality of teeth along at least one edge for facilitating a passage of a liquid from at least one side of the pan.

Another exemplary embodiment can be a device for gas-liquid contacting. The device may include a downcomer and a tray coupled proximate to a top of the downcomer. Generally, the downcomer includes first and second spaced apart side walls, a floor coupled to the side walls, and first and second opposing discharge walls coupled to respective first and second side walls and having respective ends below the floor. The floor can have at least one section adapted for permitting the passage of liquid there-through.

As a result, the embodiments disclosed herein can provide a downcomer with a wide operating range. Moreover, the embodiments disclosed herein can permit the easy modification of an existing downcomer to increase its operability.

DEFINITIONS

As used herein, the term "gas-liquid contacting" generally means the interaction of one or more gases and one or more liquids.

As used herein, the term "fluid" generally includes one or more gases and/or one or more liquids.

As used herein, the term "gas" can mean a single gas or a solution of a plurality of gases. In addition, the term "gas" may include a solution or a suspension, e.g., a vapor or an aerosol, of one or more liquid particles and/or one or more solid particles, of the same or different substances, in one or more gases.

As used herein, the term "vapor" can include a dispersion of molecules of a substance that may be liquid or solid at standard temperature and pressure in a gas.

As used herein, the term "liquid" can mean a single liquid, or a solution or a suspension of a liquid and one or more gases, liquids, and/or solids.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g. a screw, a nail, a staple, or a rivet; an adhesive; or a solder.

DETAILED DESCRIPTION

Figure 1:
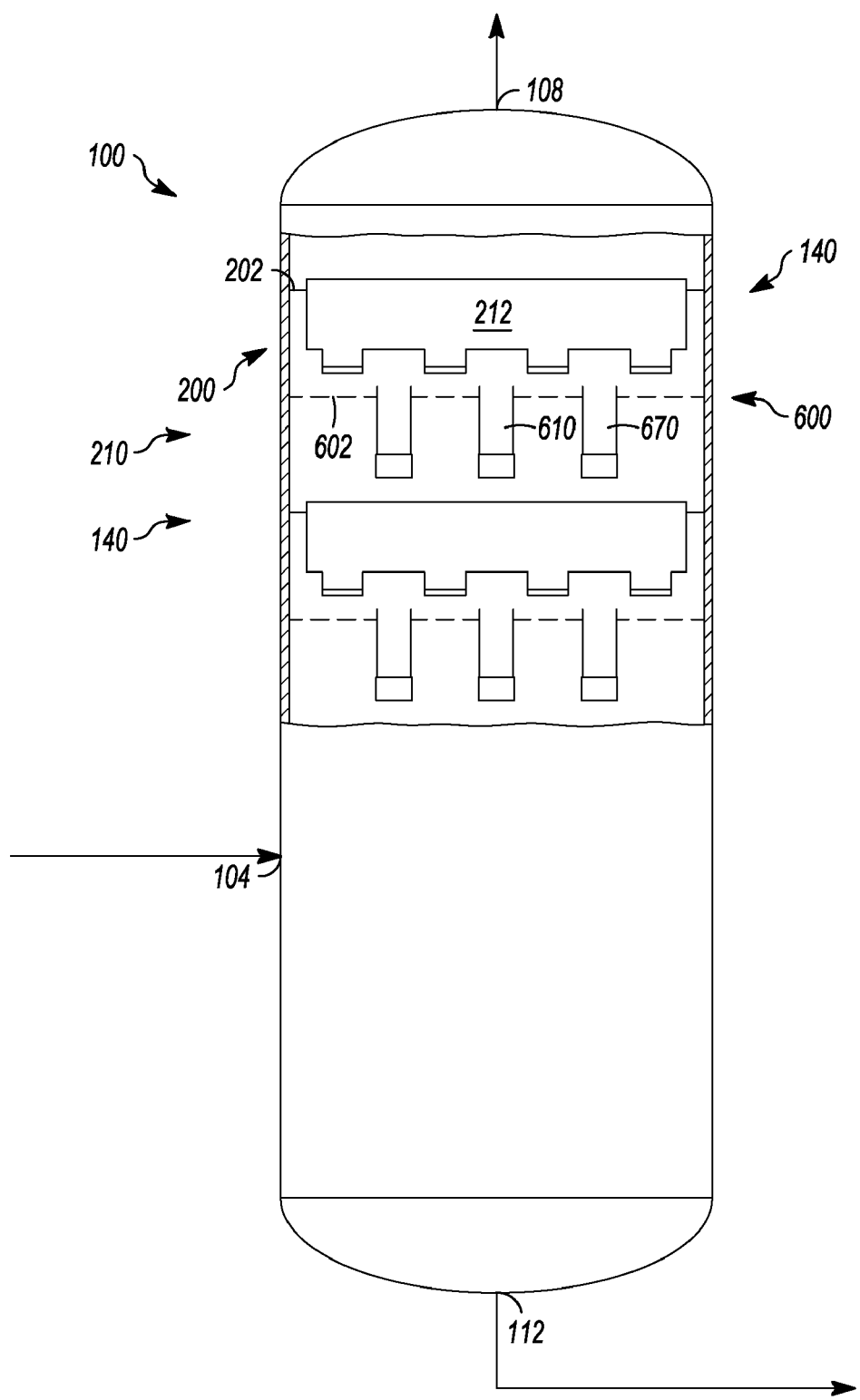
FIG. 1 is an elevational, cutaway view of an exemplary apparatus.
Figure 2:
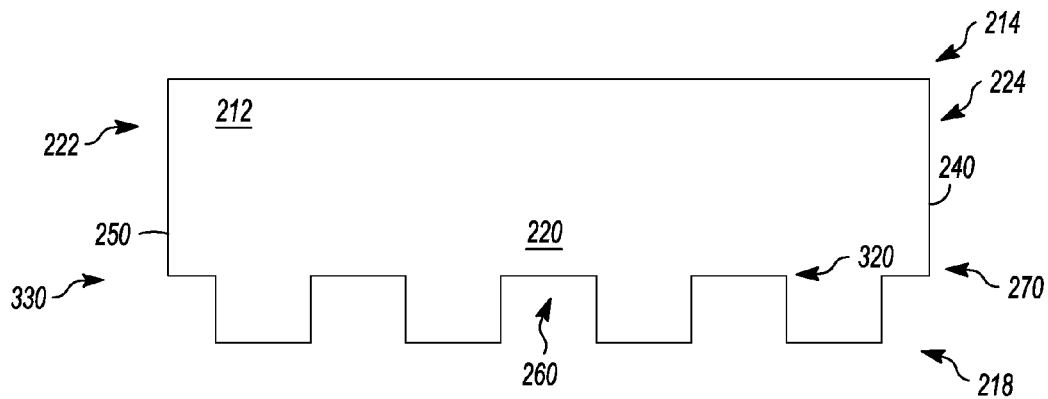
FIG. 2 is an elevational, side view of an exemplary downcomer.
Figure 3:
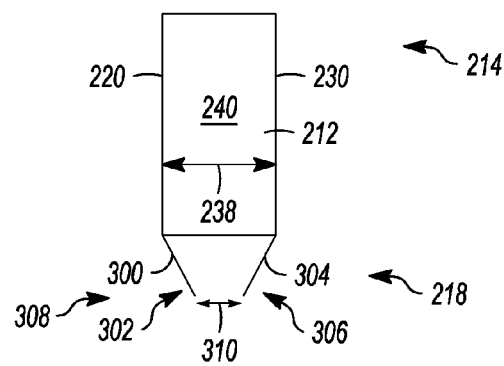
FIG. 3 is an elevational, end view of the exemplary downcomer.
Figure 4:
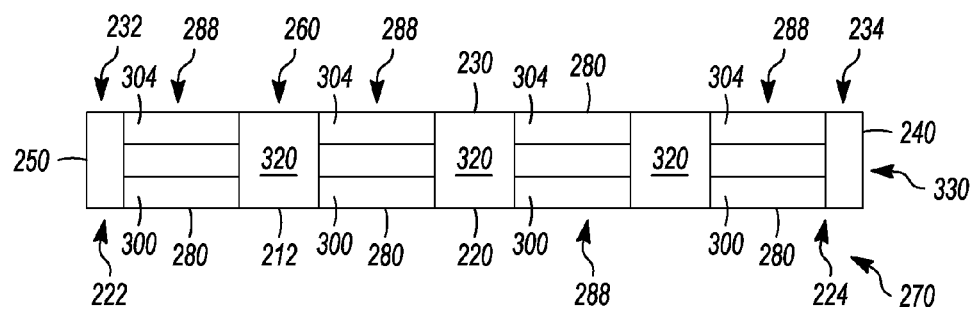
FIG. 4 is a plan, top view of the exemplary downcomer.
Figure 5:
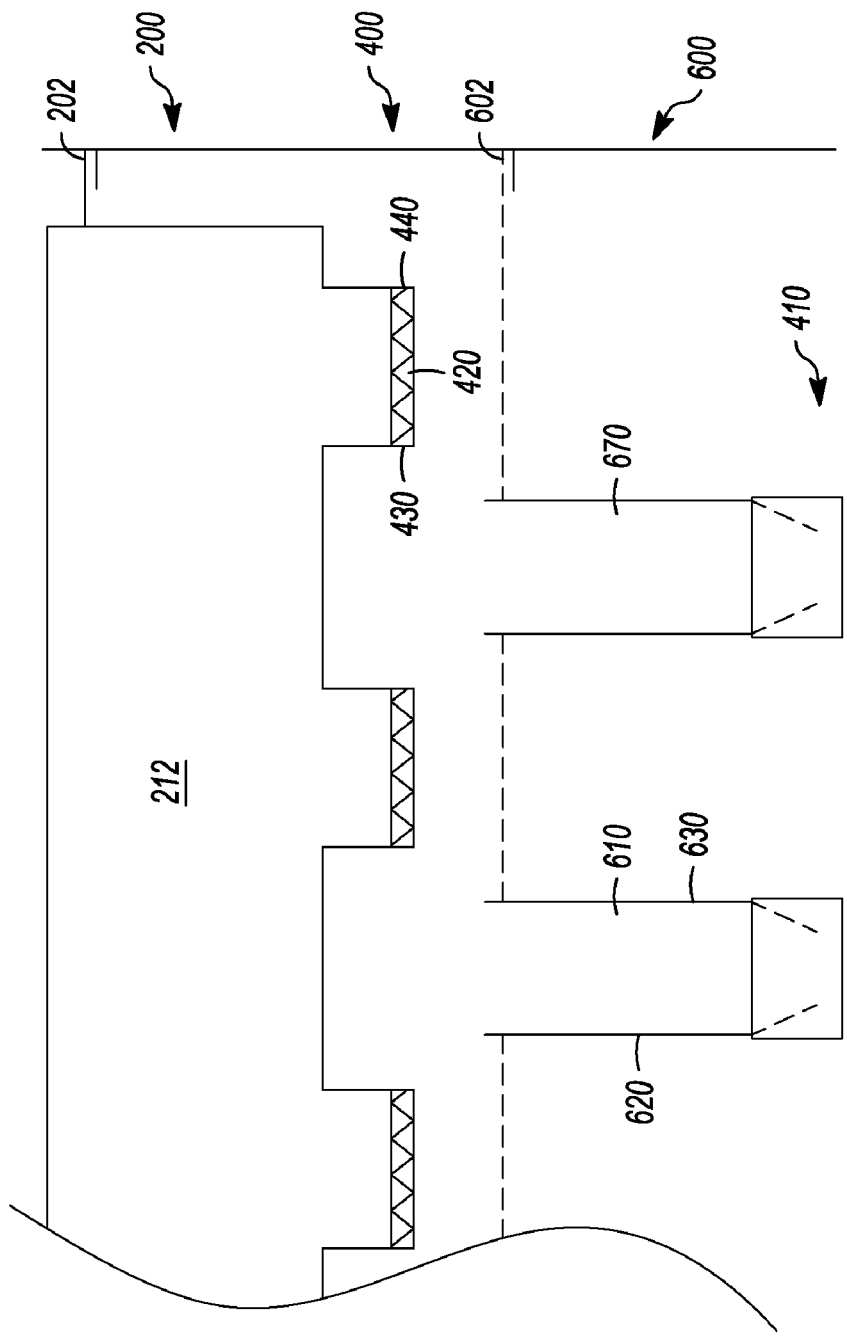
FIG. 5 is an elevational, partial view of a plurality of exemplary downcomers.
Figure 6:
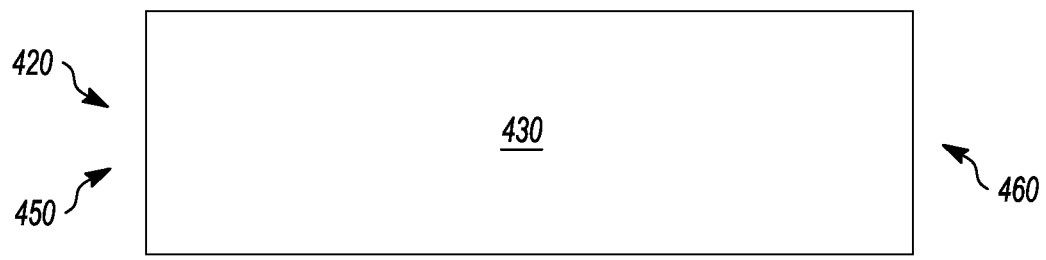
FIG. 6 is an elevational, end view of an exemplary pan.
Figure 7:
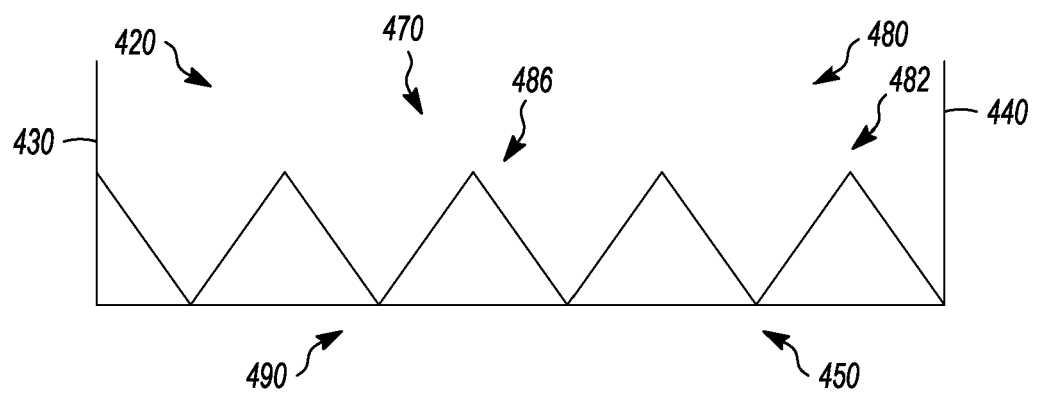
FIG. 7 is an elevational, side view of the exemplary pan.
Figure 8:
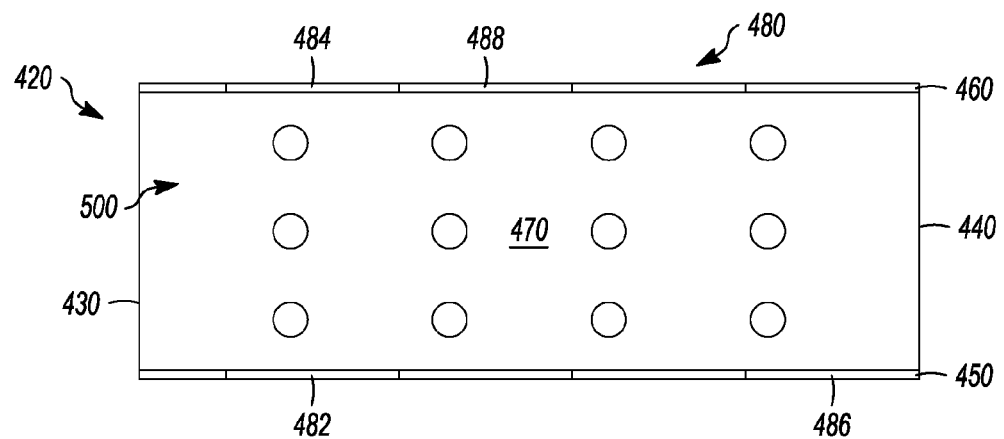
FIG. 8 is a top, plan view of the exemplary pan.

Referring to FIG. 1, an exemplary apparatus 100 is depicted. An exemplary apparatus 100 may include a distillation column or a gas absorption column. In this exemplary embodiment, the apparatus 100 can be a distillation column with an inlet 104, a gas outlet 108, and a liquid outlet 112. Typically, the distillation column 100 can also include other equipment, such as heaters, reboilers, pumps, and overhead condensers to provide reboiling or recycling of fluids to the distillation column 100. In addition, the distillation column 100 can include a plurality of gas-liquid contacting devices 140, such as devices 200 and 600, arranged vertically within the distillation column 100. Any number of devices 140 can be included in the column 100. Furthermore, the column 100 can include a support ring (not depicted) for supporting the devices 140 inside the column 100. Preferably, the devices 140 do not touch each other. Typically, each device 140 can include a tray, such as a tray 202, and one or more downcomers 210, such as the downcomer 212 in the device 200, and the downcomers 610 and 670 in the device 600. In this exemplary embodiment, each device 200 and 600 can include three downcomers, but a device can include any number of downcomers, such as five, eight, or more. In addition, although circular contacting trays are disclosed, it should be understood that the trays can take any other suitable shape, such as a polygonal shape. Generally, the trays form holes to permit gases to rise there-through. The trays 202 and 602 can rest on the column 100 support ring.

The downcomers of the devices can be aligned or offset. In this exemplary embodiment, the downcomers of each device 140 are offset by about 90° from one level to the next. Separation apparatuses including trays and downcomers, such as distillation columns, can be disclosed in U.S. Pat. No. 5,382,390; U.S. Pat. No. 6,739,585 B1; U.S. Pat. No. 6,131,891; U.S. Pat. No. 7,232,115 B2; and US 2007/0126134 A1. The apparatus 100 and its components can be formed from any suitable material, such as carbon steel, stainless steel, and/or titanium. What is more, multiples of some components, such as devices, trays, and downcomers, may be used in the apparatus 100. Desirably, each of these components may be substantially identical. As such, not all of these components will be described in the specification, and correspondingly, are not numbered in the accompanying figures.

Referring to FIGS. 1-4, a downcomer 212 of a first device 200 is depicted. Although the distillation column 100 can include multiple downcomers 210, the description of the downcomer 212 hereinafter can be representative of other downcomers in the apparatus 100. So, only the downcomer 212 is described in detail.

The downcomer 212 can have a top 214 and a bottom 218 for discharging a fluid, such as a liquid. The downcomer 212 can also have a first side wall 220 with ends 222 and 224 and a second side wall 230 with ends 232 and 234. Generally, the first side wall 220 is spaced apart from the second side wall 230, and the side walls 220 and 230 are generally parallel. In addition, the downcomer 212 can have a first end wall 240 and a second end wall 250. Generally, the first and second side walls 220 and 230 are coupled at respective ends by the first end wall 240 and the second end wall 250. A floor 260 can be coupled to the first and second side walls 220 and 230 and the first and second end walls 240 and 250. In addition, the downcomer can include an end plate that is coupled or rests on the column 100 support ring.

In this exemplary embodiment, the floor 260 can include at least one, preferably a plurality, of sections 270, which in turn, can include a first section 280 having four distinct parts, and a second section 320 having three distinct parts, in an alternating, repeating pattern 330. Each of the parts of the first and second sections 280 and 320 can be substantially identical to other parts of, respectively, the first and second sections 280 and 320. So, the parts are referred to generically as either the first section 280 or the second section 320. However, it should be understood that either section 280 or 320 can have any number of parts, and each part can be the same or different from other parts of that section.

Generally, the first section 280 can form a plurality of openings 288 that permit the passage of liquid there-through, or can include a structure forming one or more, e.g. circular or rectangular, holes. In contrast, the second section 320 is generally impervious to liquid penetration. In addition, the side walls 220 and 230 at the first section 280 can define a width 238, which is described in greater detail hereinafter.

In this exemplary embodiment, the downcomer 212 can include four sets of a first opposing discharge wall 300 and a second opposing discharge wall 304 coupled, using any suitable means such as welding or bolts, to respective sides 220 and 230 at the first section 280 of the downcomer 212. The discharge walls 300 and 304 sloping inward can form a chute at the first section 280. Furthermore, although the opposing discharge walls 300 and 304 have been disclosed with any suitable degree of tapering, it should be understood that the walls can take other suitable shapes, such as inclined or stepped on both sides, as disclosed in, for example, US 2007/0126134 A1. Also, it should be understood that any number of sets of discharge walls 300 and 304 may be used that may or may not correspond to the parts of the first section 280. The first and second opposing discharge walls 300 and 304 can taper 308 to form a distance 310 between respective ends 302 and 306. This distance 310 is generally less than the width 238 of the side walls 220 and 230. Preferably, the distance 310 can be about half the distance of the width 238. Moreover, the ends 302 and 306 are generally at a lower elevation than the second section 320.

Alternatively, the opposing discharge walls 300 and 304 can be substantially vertical and parallel, and integrally formed with the respective side walls 220 and 230. In such an embodiment, the first section can be an opening, and a substantially horizontal floor can couple ends 302 and 306 and form holes for permitting liquid to pass there-through. Optionally, the opposing discharge walls 300 and 304 can be enclosed with the downcomer 212.

Referring to FIGS. 3 and 5-8, the first device 200 can include the downcomer 212 coupled to the tray 202, and the second device 600 can include at least the downcomers 610 and 670 coupled to the tray 602. A first plurality of pans 400 can be attached to a downcomer 212 and a second plurality of pans 410 can be attached to, respectively, downcomers 610 and 670. The downcomer 610 can have a first side wall 620 and a second side wall 630. Generally, the first plurality of pans 400 can include a first pan 420. The pans, e.g. pans 400 and 410, of the distillation column 100 can be substantially similar. As a consequence, only the first pan 420 will be described in detail hereinafter.

The pan 420 can include a first end wall 430, a second end wall 440, a first side 450, a second side 460, and a bottom portion 470. The pan 420 can be coupled to the discharge walls 300 and 304 of the downcomer 212, using any suitable means such as welding or mechanical fasteners, near the bottom 218 where liquid may be discharged. Alternatively, the discharge walls 300 and 304 can be sandwiched between the end walls 430 and 440 of the pan 420 to provide a liquid seal. Particularly, the first and second end walls 430 and 440, which can be impervious to liquid, can be coupled to respective opposing discharge walls 300 and 304 (discharge walls of downcomers 610 and 670 shown in phantom in FIG. 5). Generally, the first end wall 430 is spaced apart and generally parallel to the second end wall 440. The bottom portion 470 is coupled to the respective lower ends of the first end wall 430 and the second end wall 440 forming a floor to the pan 420. The lengths of the pan 420 and the first and second opposing discharge walls 300 and 304 can be the same or different.

The bottom portion 470 of the pan 420 can form a plurality of teeth 480. Typically, the plurality of teeth 480 can have generally the same shape 490. Alternatively, the plurality of teeth 480 can be of different shapes. In addition, the plurality of teeth 480 can be of any suitable shape, but in this exemplary embodiment the plurality of teeth 480 is serrated. The plurality of teeth 480 can form a first row 482 and a second row 484 along respective edges 486 and 488. In another exemplary embodiment, the teeth 480 can form ridges extending along the entire length of the pan 420. Furthermore, one or more optional apertures 500 can be formed in rows between the teeth 480 to allow liquid to pass there-through. Although the apertures 500 are depicted in a square pattern, the apertures 500 can be arranged in any suitable pattern. Generally, the liquid is discharged through the sides 450 and 460 between the bottom of the discharge walls 300 and 304 and the pan 420, and the liquid can flow over the pan teeth 480 to the tray 602 beneath.

In operation, a fluid, such as a hydrocarbon fluid, can be provided at the inlet 104. Generally, gas rises while liquid descends in the column 100. As froth builds on, e.g., the tray 202, the liquid can pass into the downcomer 212. The liquid can then be discharged through gaps between the lower ends 302 and 306 of respective first and second opposing discharge walls 300 and 304, and the pan 420. Optionally, the liquid may also be discharged through, if present, the apertures 500 of the pan 420. Generally, the discharge area is limited so at low turndown flow rates the downcomer can be sealed by the liquid opposing the gas flow. During normal operations, the first and second opposing discharge walls 300 and 304 coupled with the first end wall 430 and the second end wall 440 can provide additional room for liquid back-up. Thus, the downcomer 212 may handle higher loads at normal operating conditions. Generally, liquid can pass through one of the plurality of openings 288 in the downcomer 212 and through the opposing discharge walls 300 and 304 to the pan 420. The pan 420 can discharge liquid from one or preferably both sides 450 and 460 so that the liquid flows generally parallel to the, e.g., downcomers 610 and 670, on the tray 602 below, and not fall directly into the downcomers 610 and 670. Preferably, the liquid lands parallel to the downcomers below so the liquid can travel horizontally across the lower tray before entering its downcomers. Thus, the liquid is mostly discharged horizontally to the underneath tray which can reduce vertical momentum, and therefore minimize liquid penetration through the tray 602 below. Moreover, the teeth 480 can facilitate discharging liquid in coarse streams to the underneath tray. Discharging the liquid in coarse streams as opposed to thin sheets can prevent the liquid from being broken up and entrained in the upflowing gases. Thus, these arrangements of components can facilitate the mass transfer operations within the distillation column 100. A small portion of liquid may flow through the apertures 500 to irrigate the tray area under the pan 420 for improving gas-liquid contacting and mass transfer.

Figure 9:
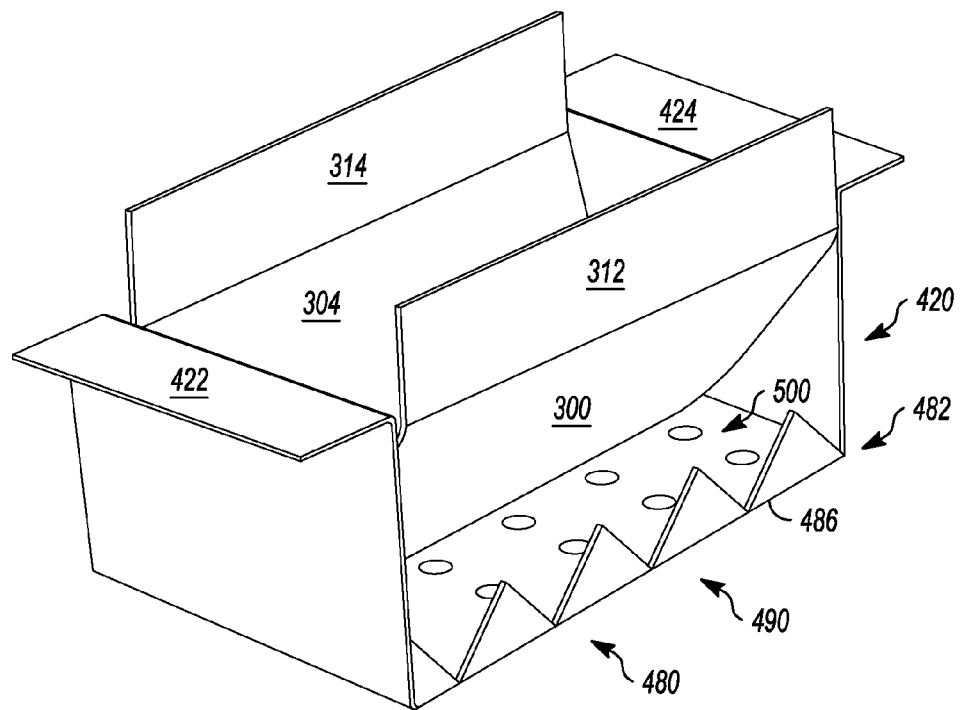
FIG. 9 is a perspective view of exemplary opposing discharge walls with an exemplary pan.

As a result, the embodiments disclosed herein can provide a device with one or more downcomers with wide operating ranges. The combination of the opposing discharge walls 300 and 304 of the downcomer 212 and the pan 420 can hydraulically and/or dynamically seal the downcomer 212 at turndown conditions. Moreover, the discharge walls 300 and 304 and the pan 420 can serve as a reservoir at high operating loads when a high turndown is required. Particularly, the opposing discharge walls 300 and 304 can act as an effective extension of the downcomer 212 for containing the liquid, so that the height of the main downcomer body and the tray spacing within the column 100 can be kept unchanged. This feature can be particularly beneficial when retrofitting discharge walls and a pan to an existing downcomer already installed in a distillation column. Particularly, referring specifically to FIG. 9, a first flange 312 can be formed integrally with the first discharge wall 300, a second flange 314 can be formed integrally with the second opposing discharge wall 304, and the flanges 422 and 424 can be formed integrally with the pan 420 to allow easy attachment of the walls 300 and 304 and/or the pan 420 to an existing downcomer by, e.g., bolting or welding. In such an installation, the floor forming one or more holes of a downcomer can be removed to create a larger opening above the opposing discharge walls 300 and 304 and the pan 420 installed at that location.

What is more, the opposing discharge walls 300 and 304 can extend below the first section 280 so that liquid can be trapped mostly in the discharge walls 300 and 304 and pan 420 at turndown and cannot flow freely from one end of the downcomer 212 to the other end. As a result, this further improves the operability of the downcomer 212 at turndown conditions should the tray 202 be unlevel after installation. In addition, the alternate sections 280 and 320 along the downcomer 212 may minimize interference of the discharge walls 300 and 304 and the pan 420 with the fluid flow on the tray and into the lower downcomers.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A downcomer for a gas-liquid contacting device, comprising:
   1) first and second spaced apart side walls;
   2) first and second end walls wherein each end wall is coupled to a respective end of the first and second side walls;
   3) a floor coupled to the side walls and the end walls;
   wherein the floor has at least one section, wherein the at least one section comprises:
   a) at least a first section adapted for permitting the passage of liquid there-through; and
   b) at least a second section; and
   4) first and second opposing discharge walls coupled to respective first and second side walls
   wherein the at least first section extends below the at least second section by means of the first and the second opposing discharge walls to form a distance between the respective ends of the first and the second opposing discharge walls.

2. The downcomer according to claim 1, wherein the distance between the ends of the first and second opposing discharge walls is less than a floor width between the first and second side walls.

3. The downcomer according to claim 2, wherein the distance between the ends is about half the floor width.

4. The downcomer according to claim 1, wherein the floor of at least one section further comprises the first section and the second section spaced in an alternating pattern.

5. The downcomer according to claim 1, wherein the second section is substantially impervious to liquid passage.

6. The downcomer according to claim 1, further comprising a pan coupled to the ends of the first and second opposing discharge walls.

* * * * *